United States Patent [19]

Nagashima et al.

[11] Patent Number: 4,704,677
[45] Date of Patent: Nov. 3, 1987

[54] OUTPUT CONTROL DEVICE FOR ELECTRICAL APPARATUS

[75] Inventors: Hironobu Nagashima; Noriyuki Asai, both of Tokyo, Japan

[73] Assignee: Asahi Kogaku Kogyo Kabushiki Kaisha, Tokyo, Japan

[21] Appl. No.: 860,385

[22] Filed: May 6, 1986

[30] Foreign Application Priority Data

May 17, 1985 [JP] Japan .................. 60-103866

[51] Int. Cl.$^4$ .................. G05B 11/01; G06G 7/00
[52] U.S. Cl. .................. 364/183; 307/529; 328/160
[58] Field of Search .................. 364/183; 307/529; 328/160

[56] References Cited

U.S. PATENT DOCUMENTS 4,494,184  1/1985  Crevel .................. 364/183
4,611,270  9/1986  Klauminzer et al. .................. 364/183

FOREIGN PATENT DOCUMENTS 0035204  2/1984  Japan .................. 364/185
0280611  9/1970  U.S.S.R. .................. 364/183

Primary Examiner—John S. Heyman
Assistant Examiner—M. R. Wambach
Attorney, Agent, or Firm—Sughrue, Mion, Zinn, Macpeak & Seas

[57] ABSTRACT

An output control device for controlling the output of an electrical apparatus such as a laser in which a desired accuracy of control is maintained irrespective of the magnitude of the target value of the output. A first multiplication circuit multiplies the output indicating signal by a value which is dependent upon the reciprocal of the target value. The output of the first multiplication circuit is compared with a predetermined reference value to form a feedback signal having a component applied to control the output in such a manner that the absolute value of the difference between the output of the first multiplication circuit and the reference value tends to be decreased. A second multiplication circuit multiplies the comparison value output by the reciprocal of the output of the first multiplication circuit, and the resulting signal is applied to control the output of the electrical apparatus.

5 Claims, 2 Drawing Figures

OUTPUT CONTROL DEVICE FOR ELECTRICAL APPARATUS

BACKGROUND OF THE INVENTION

The present invention relates to an output control device for an electrical apparatus, and more particularly to an output control device for stabilizing a laser output.

For an electrical apparatus adapted to output optical energy, electrical energy, or mechanical energy, it is necessary that the output be stably controlled. Especially, it is essential for a high power laser such as a solid-state laser or a gas laser to have an output control device which stabilizes the output and holds its magnitude to a predetermined value. For instance, in a gas laser of the type in which the electric discharge caused in the laser tube is utilized to induce a laser beam, the discharge current is controlled in order to maintain the laser output at a desired value. In a laser such as a laser of the type in which a laser beam is induced by light emitted by a discharge tube such as a krypton lamp, the discharge current of the discharge tube is utilized to maintain the laser output at a desired value. These output control devices generally employ a negative feedback circuit.

An example of an output control device for a laser is shown in FIG. 2. In FIG. 2, reference numeral 10 designates a signal setting circuit for setting the level of a signal P at an optional value; 12, a subtraction circuit; 14, a multiplication circuit having a multiplication factor G; 16, an addition circuit; 18, a laser device; and 20, a laser power meter. The set value P is a target value for the output of the laser device 18.

If the output of the laser power meter 20 is represented by M, then the output of the subtraction circuit 12 is (P−M), and the output X of the addition circuit 16 is:

$$X = P + G(P - M) \qquad (1)$$

In general, $$M = AX \qquad (2)$$

where A is a conversion factor dependent on the efficiency of the laser device 18 and other coefficients. As is apparent from equations (1) and (2), the output M of the laser device is stably controlled with respect to the set value P.

Recently, digital circuits have been extensively utilized to form various arithmetic circuits. In the above-described conventional device, digital operations are carried out in the setting circuit 10, the subtraction circuit 12, the amplifier 14, and the addition circuit 16. In the laser device, electric power corresponding to a digital value X is applied to the laser medium by an internal electric power source. The values P, X and M are all provided as digital values.

On the other hand, digital arithmetic circuits unavoidably include quantizing errors. Therefore, in order to ensure a desired accuracy for digital operations employing negative feedback in the presence of a digital error ΔP, the arithmetic accuracy of the negative feedback circuit, i.e., the number of bits of the various parameters, must be determined for the minimum set value P. However, if such a method is employed, excessively high accuracy operations must be carried out for intermediate to the maximum set values of P, with the results that the arithmetic calculation time is long and the arithmetic circuits are considerably expensive.

SUMMARY OF THE INVENTION

Accordingly, an object of the invention is to eliminate the above-described difficulties accompanying a conventional output control device. More specifically, an object of the invention is to provide an output control device which, irrespective of the magnitude of the target value P for the output M of a laser, controls the output M with a desired accuracy.

An output control device according to the invention comprises output detecting means for generating an output indicating signal which represents the output of an electrical apparatus, a first multiplication circuit for multiplying the output indicating signal by a value which depends on the reciprocal of a target value for the output of the electrical apparatus, a digital arithmetic circuit for comparing the output of the first multiplication circuit with a predetermined reference value and forming a feedback signal having a component which controls the output of the electrical apparatus so that the absolute value of the difference between the output of the first multiplication circuit and the predetermined reference value tends to be decreased, and a second multiplication circuit for multiplying the output of the digital arithmetic circuit by a value which is equal to the reciprocal of the multiplication factor of the first multiplication circuit, the output of the second multiplication circuit being applied to control the electrical apparatus.

DESCRIPTION OF THE PREFERRED EMBODIMENTS

The invention will be described with reference to the accompanying drawings.

Figure 1:
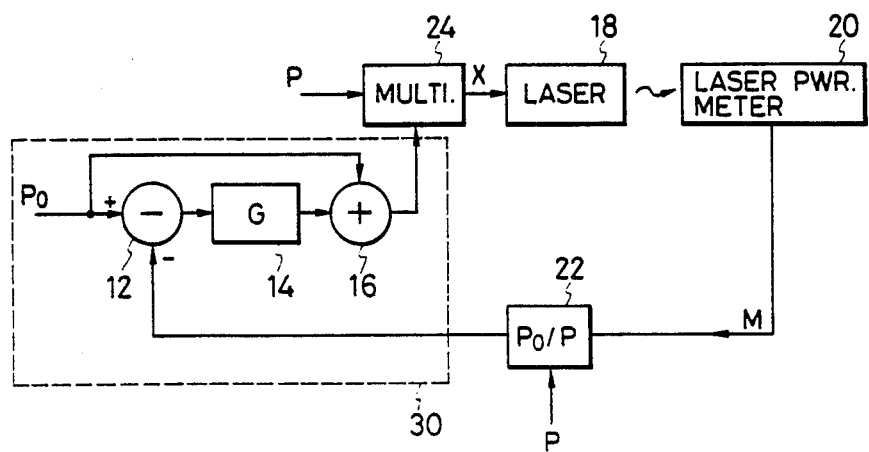
FIG. 1 is a block diagram showing the arrangement of an example of an output control device according to the invention, which is employed for controlling the output of a laser device by way of example.

FIG. 1 is a block diagram showing the arrangement of an output control device according to the invention. In FIG. 1, a subtraction circuit 12, a multiplication circuit 14, an addition circuit 16, a laser device 18, and a laser power meter 20 are the same as in FIG. 2. However, it should be noted that a certain reference value $P_o$ is applied to the positive input terminal of the subtraction circuit 12, and the output M of the laser power meter M is applied to the negative input terminal of the subtraction circuit 12 through a multiplication circuit 22 having a multiplication factor $P_o/P$, where P is the target value for the output M. In the multiplication circuit 22, the output M is normalized for comparison with the reference value $P_o$. The output of the subtraction circuit 12 is applied to the input terminal of the addition circuit 16, to the other input terminal of which the reference value $P_o$ is applied. The output of the addition circuit 16 is applied to a multiplication circuit 24 where the output of the addition circuit 16 is multiplied by $P/P_o$. The output X of the multiplication is supplied to the laser device 18.

In the case where analog signals are employed, the multiplication circuits 14, 22 and 24 may be replaced by amplifiers or attenuators.

Figure 2:
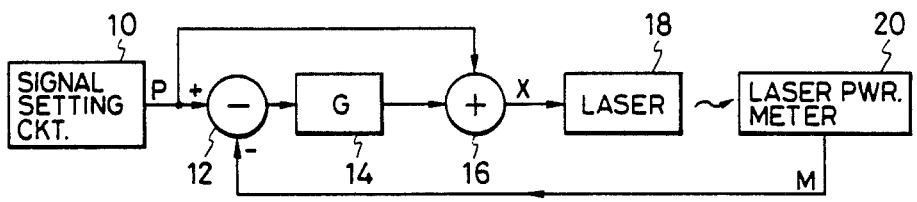
FIG. 2 is a block diagram showing the arrangement of a conventional output control device for an electrical apparatus.

In the circuit of FIG. 2, the output of the multiplication circuit 22 is:

$$MP_o/P$$

and the output of the subtraction circuit 12 is:

$$P_o - P_o M/P$$

Accordingly, the output of the addition circuit 16 is:

$$P_o + G(P_o - P_o M/P)$$

The output X of the multiplication circuit 24 is:

$$X = (P_o + G(P_o - P_o M/P))(P/P_o)$$
$$= P + G(P - M)$$

This is the same equation (1) above. That is, similar to the conventional circuit of FIG. 1, the circuit of FIG. 2 according to the invention can stabilize the output M and control it to a value corresponding to the target value P.

In addition, it should be noted that in the block 30 (indicated by a broken line) the output power of the laser device 18, after being normalized, is compared with the reference value $P_o$ to provide a feedback signal, and therefore the feedback signal can be provided with a desired accuracy irrespective of the target value P. That is, in the block 30, the input to the block 30 (the output of the multiplication circuit 22) and the output of the block 30 (the output of the addition circuit 16) are both normalized, and the feedback operation is carried out with predetermined accuracy with respect to the laser output M. Accordingly, the circuit of the invention is free from the difficulty that, as in the conventional circuit, in order to ensure a certain accuracy for the minimum target value P, operations must be carried out with excessively high accuracy for intermediate to maximum target values.

As is apparent from the above description, according to the invention, the output of an electrical apparatus can be stabilized and controlled with a desired accuracy irrespective of its magnitude. Accordingly, it is unnecessary for the electrical apparatus to employ a high accuracy operation circuit as its output control device, and therefore the electrical apparatus can be manufactured at low cost.

We claim:

1. An output control device for controlling the output of an electrical apparatus using feedback, comprising:

output detecting means for generating an output indicating signal which represents an output of said electrical apparatus;

a first multiplication circuit for multiplying said output indicating signal by a multiplication factor value dependent on a reciprocal of a target value for said output of said electrical apparatus;

a digital arithmetic circuit for comparing an output of said first multiplication circuit with a predetermined reference value and forming a feedback signal having a component which controls said output of said electrical apparatus so that an absolute value of the difference between said output of said first multiplication circuit and said predetermined reference value tends to decrease; and a second multiplication circuit for multiplying an output of said digital arithmetic circuit by a value equal to a reciprocal of said multiplication factor value of said first multiplication circuit, an output of said second multiplication circuit being applied to control said electrical apparatus.

2. The output control device as claimed in claim 1, in which said electrical apparatus is a laser device.

3. The output control device as claimed in claim 1, wherein said output indicating signal is in analog form and said multiplication circuits comprise amplifiers.

4. The output control device as claimed in claim 1, wherein said output indicating signal is in analog form and said multiplication circuits comprise attenuators.

5. The output control device as claimed in claim 1, wherein said output indicating signal is in digital form and said multiplication circuits comprise digital multipliers.

* * * * *